(12) United States Patent
Bauer et al.

(10) Patent No.: US 7,343,352 B2
(45) Date of Patent: Mar. 11, 2008

(54) METHOD AND SYSTEM FOR ASSESSING THE QUALITY AND COST OF INSPECTION

(75) Inventors: Lowell Wilson Bauer, Walpole, NH (US); Gene Edward Wiggs, Middletown, OH (US)

(73) Assignee: General Electric Company, Niskayuna, NY (US)

( * ) Notice: Subject to any disclaimer, the term of this patent is extended or adjusted under 35 U.S.C. 154(b) by 910 days.

(21) Appl. No.: 10/065,580

(22) Filed: Oct. 31, 2002

(65) Prior Publication Data

US 2004/0088265 A1    May 6, 2004

(51) Int. Cl.
G06F 17/00 (2006.01)
G06F 19/00 (2006.01)
G06F 17/30 (2006.01)
G01N 37/00 (2006.01)

(52) U.S. Cl. .................. 705/400; 700/204; 702/84; 702/108; 705/10

(58) Field of Classification Search ............... 705/400, 705/4, 1
See application file for complete search history.

(56) References Cited

U.S. PATENT DOCUMENTS 4,677,993 A * 7/1987 Kato et al. ............. 131/280
5,608,658 A * 3/1997 Yao et al. ............... 702/108

FOREIGN PATENT DOCUMENTS

JP    0644422    *    2/1994

OTHER PUBLICATIONS

"The Delivery and Control of Quality in Supplier-Producer Contracts", Reyniers and Tapiero, Management Science, vol. 41, No. 10, Oct. 1995.*
"Optimal Lot Sizing, process Quality improvement and setup cost reduction", Porteus Evan, L, Operation Research, vol. 34, No. 1, Jan.-Feb. 1986.*
Papoulis, A., *Probability, Random Variables, and Stochastic Processes*, McGraw Hill, 1964, pp.

* cited by examiner

*Primary Examiner*—John W. Hayes
*Assistant Examiner*—Rutao Wu
(74) *Attorney, Agent, or Firm*—Penny A. Clarke; Patrick K. Patnode

(57) ABSTRACT

A method, system, and software for assessing the cost tradeoffs associated with performing inspection includes determining measurement variations and product characteristic variations to define an inspection plane. The inspection plane is divided into a plurality of regions corresponding to respective different outcomes resulting from an inspection process. The probability of each outcome is determined based on a probability mass in each region of the inspection plane, wherein the probability mass is based on a joint probability density of the measurement and product characteristic variations. Costs are associated to various outcomes based on the inspection process, and overall costs of the inspection process are computed by using the associated costs and the determined probability of each outcome based on the regions of the inspection plane.

17 Claims, 15 Drawing Sheets

| Inspection Outcome | Probability of Outcome |
|---|---|
| 1) product within its specification limit accepted | p1 |
| 2) product outside its specification is rejected | p2 |
| 3) product within its specification is rejected | p3 |
| 4) product outside its specification is accepted | p4 |//
| Table 1. Inspection outcome probabilities | |

| Event | Unit cost per Event | Probability of Event | Cost per unit product |
|---|---|---|---|
| Product Inspection | CI | 1 | CI |
| Product Scrap/Rework | CR | p2+p3 | (p2+p3)*CR |
| Escaping Defect | CE | p4 | p4*CE |
| Unnecessary rework | | p3 | p3*CR |
| Table 2. Costs and weighted contributions | | | |

FIG. 4

| First Inspection Outcome | Probability of Outcome |
|---|---|
| 11) product within its specification limit accepted | p11 |
| 12) product outside its specification is rejected | p12 |
| 13) product within its specification is rejected | p13 |
| 14) product outside its specification is accepted | p14 |
| Second Inspection Outcome | |
| 21) product within its specification limit accepted | p21 |
| 22) product outside its specification is rejected | p22 |
| 23) product within its specification is rejected | p23 |
| 24) product outside its specification is accepted | p24 |

Table 3. Inspection outcome probabilities

FIG. 6

Table 4. Costs and weighted contributions

| | | |
|---|---|---|
| Process standard dev | 0.0010 | inches |
| Process center | 10.0000 | inches |
| Lower specification limit (LSL) | 9.9970 | inches |
| Upper specification limit (USL) | 10.0030 | inches |
| Calculated specification center | 10.0000 | |
| Lower inspection limit (LIL) | 9.9985 | inches |
| Upper inspection limit (UIL) | 10.0015 | inches |
| Calculated inspection center | 10.0000 | |
| Inspection bias | 0.0000 | inches |
| Enter std dev or gage R&R | Gage noise std dev | | inches |
| | % Gage R&R | 40 | percent |

| Inspected product judged against product spec limits (PPM) | |
|---|---:|
| good product accepted | 826047 |
| good product rejected | 171254 |
| bad product accepted – escapes | 1 |
| bad product rejected | 2699 |

FIG. 10

METHOD AND SYSTEM FOR ASSESSING THE QUALITY AND COST OF INSPECTION

BACKGROUND OF THE INVENTION

This invention relates generally to assessing the quality and cost of inspections. More specifically, the present invention is directed to a method, system, and software for factoring costs associated with inspection levels and results for assessing and optimizing the overall cost associated with inspections.

Controlling the number of product defects has become an important part of managing the costs and efficiencies associated with manufacturing and distribution processes. Inspection is often used to measure the variation in products as a method to control the number of escaping defects. Unfortunately, inspection is often an imperfect and sometimes expensive process. Product measurements are often corrupted by noise introduced by the measurement or gaging process. Furthermore, there is a lack of systems for evaluating and managing an inspection process so as to trade off the costs of inspection, re-inspection, scrap/rework of products identified as defective and the often large costs associated with escaping defects.

Previously known methods of analyzing the inspection process do not enable the timely, accurate, and efficient calculation of various tradeoffs between inspection accuracy, product specification or tolerance limits, inspection limits, and/or multistage inspection. These methods do not enable the convenient evaluation of an inspection process where the measurement error is dependent on the size of the permissible variation of the product characteristic being measured.

In particular, the quantitative results of making inspection limits more restrictive than specification limits and/or performing multistage inspections have not been available except through time consuming simulation analysis. Running accurate simulations can be very time consuming during inspection tradeoff optimization determination particularly in ranges where the emphasis is on allowing only a few defects per million to pass through.

BRIEF DESCRIPTION OF THE INVENTION

In one aspect, the present invention provides a computer implemented method of assessing the cost tradeoffs associated with performing inspection, including: determining measurement variations and product characteristic variations to define an inspection plane; dividing the inspection plane into a plurality of regions corresponding to respective different outcomes resulting from an inspection process; determining the probability of each outcome based on the probability mass in each region of the inspection plane; associating costs to various outcomes based on the inspection process; and computing overall costs of the inspection process by using the associated costs and the determined probability of each outcome based on the regions of the inspection plane.

In another aspect, the present invention further comprises optimizing the computed overall costs by varying the costs associated with the various outcomes and/or by varying the permissible product characteristic variation limits.

In one aspect, the present invention provides for optimizing the computed overall costs by using an inspection limit that is different from the permissible product specification limit.

In one aspect, the present invention provides that the step of determining the probability of each outcome comprises determining a joint probability density of the measurement variation and the product characteristic variation.

In one further aspect, the present invention provides performing a second inspection on all products rejected in a first inspection wherein the second inspection alters the measurement variations.

In another aspect, the present invention provides a system for assessing the cost tradeoffs associated with performing inspections, comprising: an input unit for receiving input measurement variations, product characteristic variations, and costs of various outcomes based on an inspection process; and a computing unit configured to: define an inspection plane based on the input measurement variations and the product characteristic variations; divide the inspection plane into a plurality of regions corresponding to the respective different outcomes resulting from an inspection process, determine the probability of each outcome based on the probability mass in each regions of the inspection plane, wherein the probability mass is determined based on the joint probability density of the measurement variation and the product characteristic variation; and computing overall costs of the inspection process by using the associated costs and the determined probability of each outcome based on the regions of the inspection plane.

In yet another aspect, the present invention provides a computer readable data storage medium having program code recorded thereon for assessing the cost tradeoffs associated with performing inspections, the program code causing a computing system to perform steps comprising: determining measurement variations and product characteristic variations to define an inspection plane; dividing the inspection plane into a plurality of regions corresponding to respective different outcomes resulting from an inspection process; determining the probability of each outcome based on the probability mass in each region of the inspection plane, wherein the probability mass is determined based on the joint probability density of the measurement variation and the product characteristic variation; associating costs to various outcomes based on the inspection process; and computing overall costs of the inspection process by using the associated costs and the determined probability of each outcome based on the region of the inspection plane.

BRIEF DESCRIPTION OF THE DRAWINGS

The accompanying drawings, which are incorporated in and constitute a part of the specification, illustrate a presently preferred embodiment of the invention, and, together with the general description given above and the detailed description of the preferred embodiment given below, serve to explain the principles of the invention.

FIG. 4 illustrates tables used in building a product cost model.

FIG. 6 shows tables disclosing probabilities of outcomes in a two stage inspection process.

FIG. 10 shows a result table after a first inspection.

DETAILED DESCRIPTION OF THE INVENTION

In one aspect, the evaluation or assessment of an inspection process involves finding the probabilities of four exemplary possible inspection outcomes: (1) a product specification characteristic within its specification limit is accepted; (2) a product specification characteristic outside of the specification limit is rejected; (3) a product within specification is rejected; and (4) a product outside of the specification is accepted. Outcomes (1) and (2) are the desired results of an inspection process since "good" products are accepted and "bad" products are rightfully rejected. Outcome (3) implies that a good product is rejected giving rise to costly and time consuming rework (or scrapping) for a product that is within the specification limits. Outcome (4) is generally very undesirable since it means that a defective product is escaping. Depending on the type and criticality of the product such a defective escaped product can give rise to considerable liability or otherwise generate bad publicity for the manufacturer or distributor. The method, system, and software discussed herein provides an efficient method for quickly and accurately evaluating the four possible outcomes in different inspection situations and relating the outcomes to average inspection related product costs.

Figure 1:
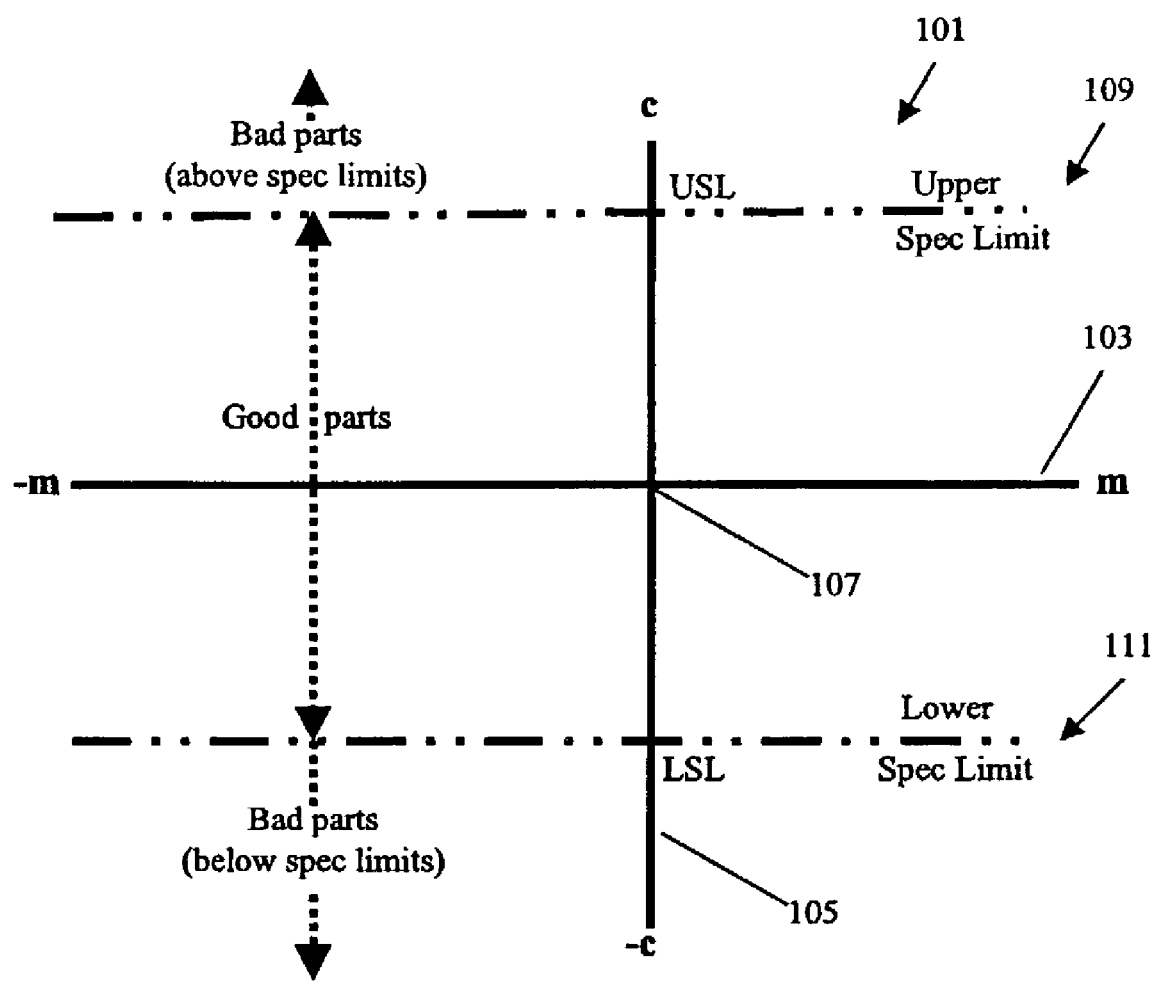
FIG. 1 is a diagram illustrating an inspection plane.

With reference to the figures, FIG. 1 shows a representation of a product specification characteristic variation (c) axis 105 and a measurement variation or error (m) 103 to define an inspection plane 101 that is centered with its origin at 107. The origin 107 represents the case where the product is exactly right and the measurement is also perfect. Moving horizontally from the origin along the axis 103 represents an error in the measurement system while moving vertically along the axis 105 represents an error in a product's characteristic. If the product characteristic variation falls within the range defined by a upper specification limit 109 and a lower specification limit 111, then the product is considered to be acceptable. If not, a defect has occurred. Therefore, a point in the inspection plane 101 represents a combination of a product characteristic variation 105 and a measurement variation error (or variation) 103.

Figure 2:
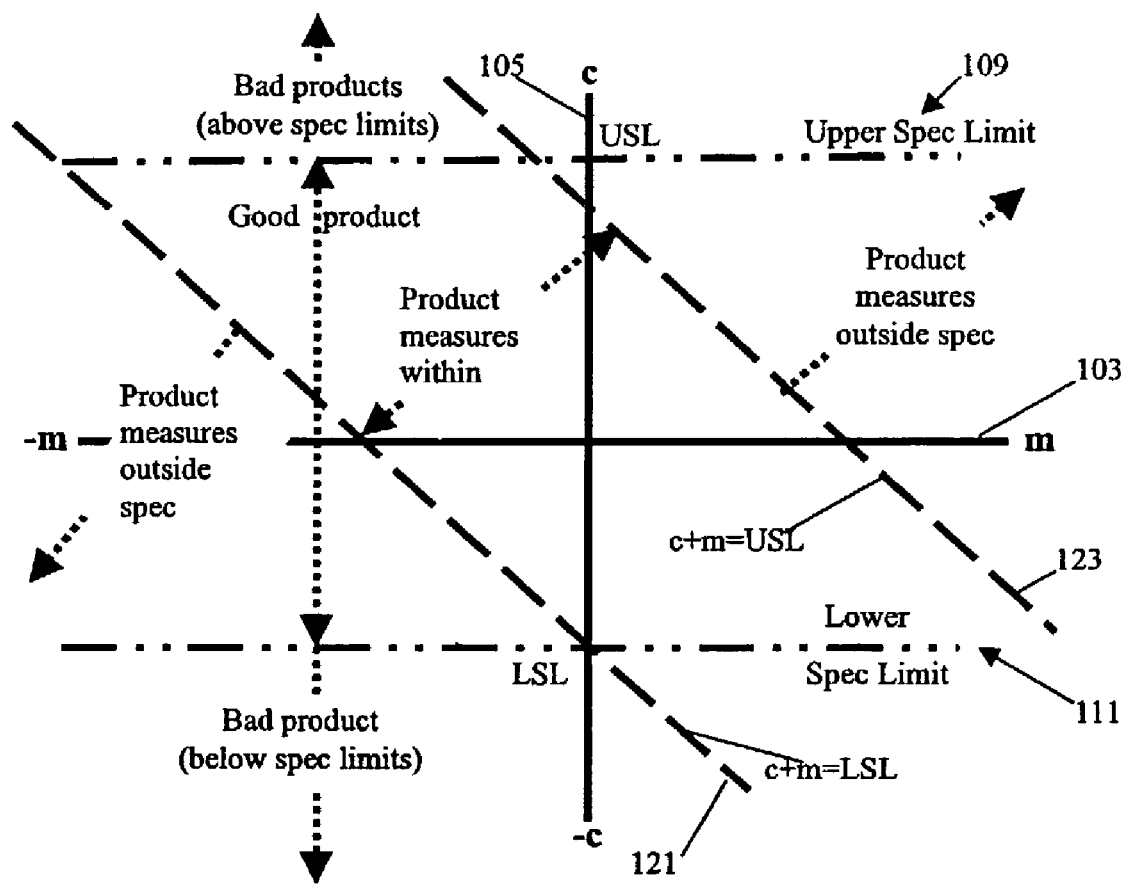
FIG. 2 is a diagram that illustrates divisions of the inspection plane.

FIG. 2 is a diagram that shows two sloping lines 121 and 123 in the inspection plane. The first sloping line 123 is defined by all points such that the sum of their respective values (c and m) along the product specification variation axis 105 and the measurement error (or variation) axis 103 equals the upper specification limit 109. Likewise, the second sloping line 121 is defined by all points such that the sum of their respective values along the product characteristic variation axis 105 and the measurement error (or variation) axis 103 equals the lower specification limit 111.

Any combination of the values of c and m that lies between these two sloping lines 121 and 123 represents a measurement within the specification limits while combinations that lie outside these lines represent a measurement outside the specification limits.

Figure 3:
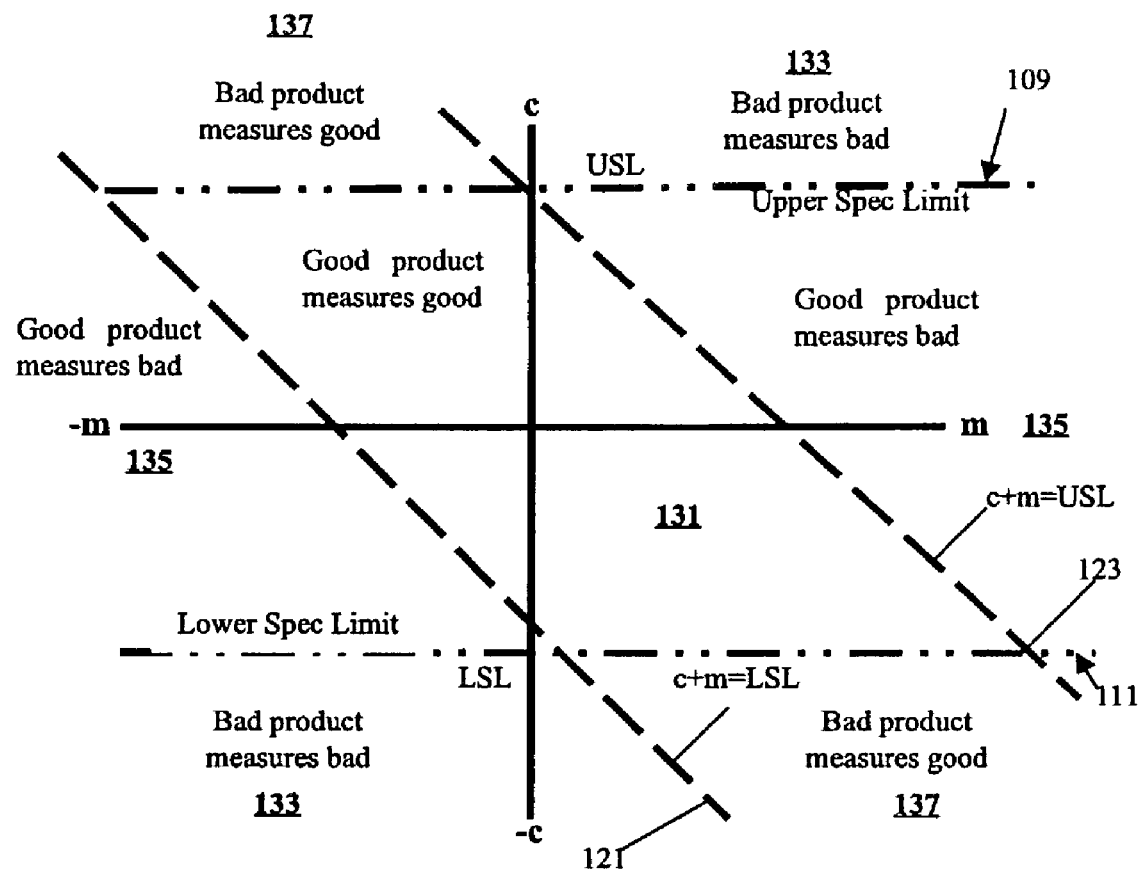
FIG. 3 is a diagram that illustrates that the inspection plane is divided into regions corresponding to four outcomes of the inspection process.

As shown in FIG. 3, the sloping lines 121 and 123 and the upper and lower specification limit lines 109 and 111, allow the inspection plane to be divided into regions corresponding to the four outcomes discussed earlier herein. To evaluate the probability of each of the four inspection outcomes, a joint probability density of the product specification variation and the measurement variation is defined. For example, the joint probability density may be computed by assuming that product specification variation values and the measurement variation values follow a known or assumed mathematical distribution that is characterized by corresponding mathematical parameters. As one example, the variation values may be assumed to follow a normal distribution that is characterized by parameters such as a central value and a standard deviation. Other similar mathematical distributions and their parameters are known to skilled in the art and may also be used as would be apparent to those skilled in the art. The probability of each outcome is then found by summing the probability "mass" in each region. The concept of probability mass based on the joint probability density in a region is within the knowledge of those skilled in the art as exemplified by the discussion in the text "Probability, Random Variables, and Stochastic Processes," by Athanasios Papoulis (McGraw Hill, 1964), the contents of which are incorporated herein in its entirety.

FIG. 3 shows a simple inspection situation where the inspection limits are placed at the specification limits. However, inspecting using such a system often allows an unacceptable number of escaping defects since measurement noise or error can easily make products that are outside the specification limits to erroneously measure within the specification limits. As shown in region 137, "bad" products are measured as being good using such a system. In contrast, region 131 indicates good products that are measured as being good. Regions 135 indicates that good products are measured as being bad giving rise to unnecessary rework or replacement while region 133 represents that bad products are correctly measured as being bad.

As shown in FIG. 4, a product cost model is built using the probability of each inspection outcome as shown in tables 401 and 411 in FIG. 4. Table 401 identifies the probabilities of the different inspection outcomes derived by summing the probability masses as described earlier herein. Table 411 illustrates how the probabilities of table 401 along with the costs associated with the various inspection stages (or events) are used to calculate the overall cost associated with the inspection process. The different inspection stages (and costs associated therewith) include: product inspection, product scrapping or rework for products that are rejected by the inspection process, costs associated with defective products that escape through he inspection process, and finally unnecessary rework associated with good products that are erroneously identified as being bad by the inspection process. It should be noted that the probabilities of outcomes are determined by the inspection process, and can only be changed by changing the inspection process.

Figure 5:
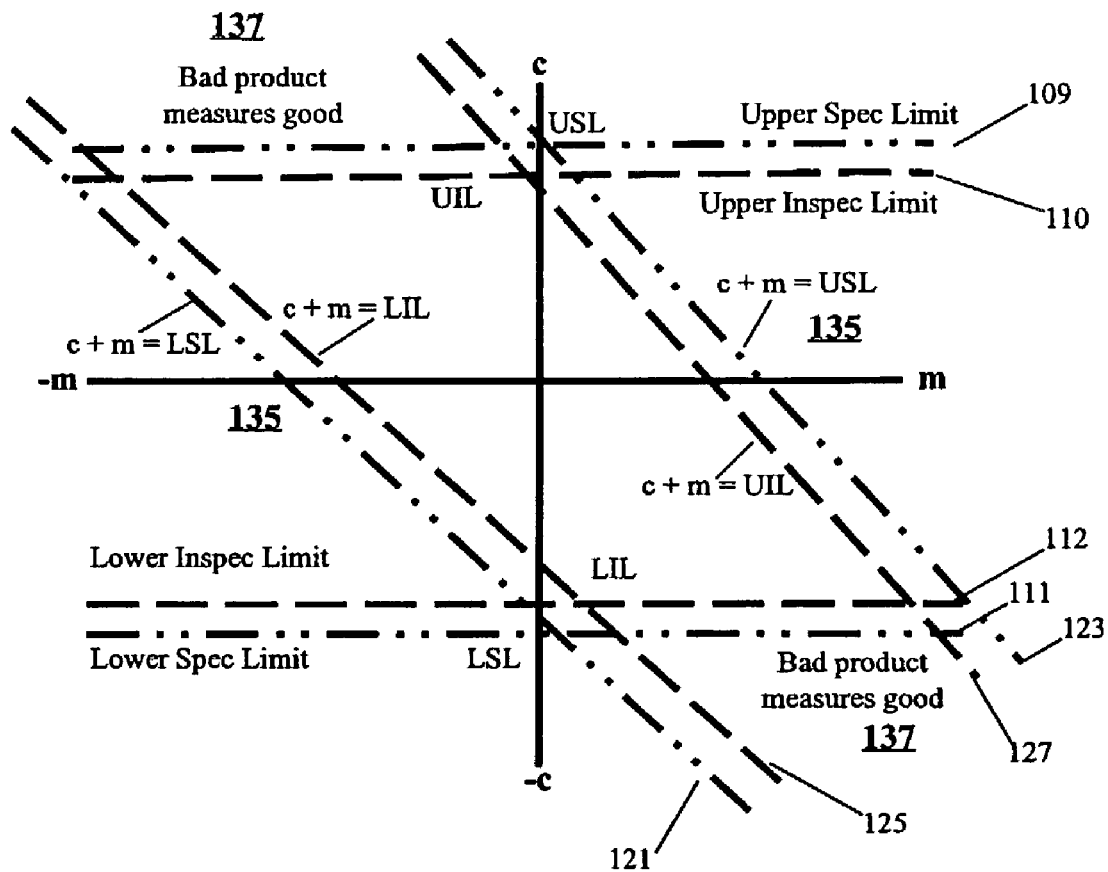
FIG. 5 is a diagram illustrating tighter inspection limits.

To reduce the number of escaping defects, inspection limits can be set within the product specification limits, as illustrated in FIG. 5. Accordingly, a lower inspection limit (LIL) 112 and upper inspection limit (UIL) 110 may be set that are narrower than the lower specification limit 111 and the upper specification limit 109. In fact, for many inspections situations, the inspection evaluation method disclosed above reveals that more restrictive inspection limits must be employed to assure that only an acceptably small number of defects escape. FIG. 5 shows that by making inspection limits 110 and 112 more restrictive than the specification limits 109 and 111, the area of the "bad product measures good" region 137 is diminished because the distance between the inspection limits 125 and 127 is reduced while the specification limits remain the same. Therefore, fewer defective products will erroneously escape the inspection process. At the same time, however, additional good product that is within the specification limits will be rejected as indicated by the expanded region 135.

The method disclosed earlier herein for inspection against specification limits can extended to the tighter inspection limits illustrated in FIG. 5. Just as shown as discussed earlier with respect to FIG. 3, the four regions of possible inspection outcomes are determined and then the joint probability mass in each of the regions is summed. Tables 401 and 411 are still used to describe the probabilities and unit product cost for the inspection process, although the probabilities in Table 401 will change as a function of the inspection limits UIL 110 and LIL 112.

With the introduction of inspection limits, well known optimization techniques can now be applied to minimize the average cost per unit for a product. Therefore, by varying the inspection limits and the associated costs, the average cost per unit product can be derived and optimized so that an optimal inspection limits are derived.

Of course, in many situations the cost of an escaping defect may include intangibles or may be difficult to quantify (loss of reputation, uncertain legal liability, for example). In such situations, optimization can be still be achieved with a maximum number of allowable defects operating as a constraint to the optimization process.

The inspection analysis disclosed herein can be extended to a two-stage inspection process. In such a process, a first inspection is made and rejected units are then subjected to a second inspection. In practice, the first inspection may be a low-cost screening method, while the second is a more costly and precise method. To evaluate the two-stage inspection, the probability density function for the population of rejected units is calculated and used in the same manner as the density function in the one-stage analysis. As would be expected, the density function for rejected units is highest near the inspection limits. Accordingly, as shown in table 601 in FIG. 6, the probabilities p11-p14 of outcomes for the first inspection and as shown in table 611, the probabilities p21-24 of the same outcomes for the second inspection are computed or derived as discussed earlier herein.

Figure 7:
FIG. 7 shows a table for calculating the cost of an inspection process.

As shown in table 701 in FIG. 7, the cost per unit product per inspection event for the two step inspection is calculated. As shown in the table, costs C11 and C12 are associated with the first and second product inspection with the C12 typically being greater than C11. The second inspection is only done on products that fail the first inspection (probability p12+p13). Likewise, product scrap rework is only done of products that fail the second inspection (probability p22+p23). The probability of an escaping defect is p14+p24 (i.e., defective products that are passed in either of the two inspection steps). Finally, the probability of unnecessary rework should be reduced to the probability p23 based on the better quality second step inspection. Multiplying these probabilities by the respective costs yield a cost per unit product for the inspection process. In the two step inspection process, the cost associated with the second inspection is offset by the reduction in unnecessary rework of good products that are indicated as being bad in the more low cost first inspection step. As before, the two step inspection process can also be optimized by varying the various cost and inspection process parameters to achieve an optimized result.

FIGS. 8-14 illustrate one exemplary embodiment of assessing the cost of inspection in a two step inspection process. The inspection process evaluation method described in this exemplary embodiment has been implemented in a standard desktop computer using a common spreadsheet software program having a computing engine and an optimizer.

Figure 8:
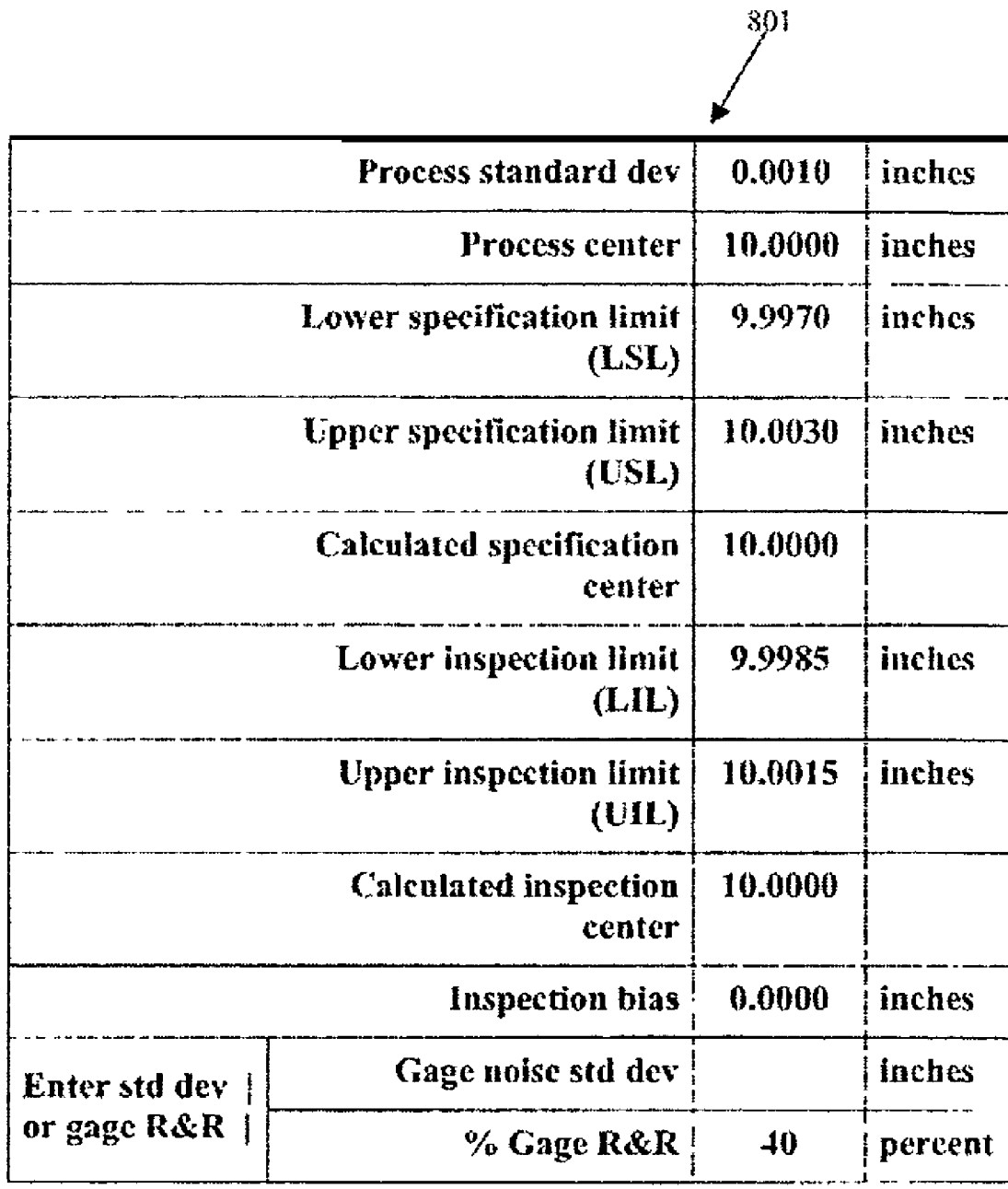
FIG. 8 shows an exemplary operator input interface for inputting various parameters for the inspection process.

FIG. 8 shows exemplary operator input interface 801 for inputting various parameters for the inspection process. Some of the parameters input include: process standard deviation, process center, a lower specification limit (LSL), an upper specification limit (USL), a calculated specification center, a lower inspection limit (LIL), an upper specification limit (UIL), a calculated inspection center, and a measure of gage or measurement error for a particular type of inspection to be used.

Figure 9:
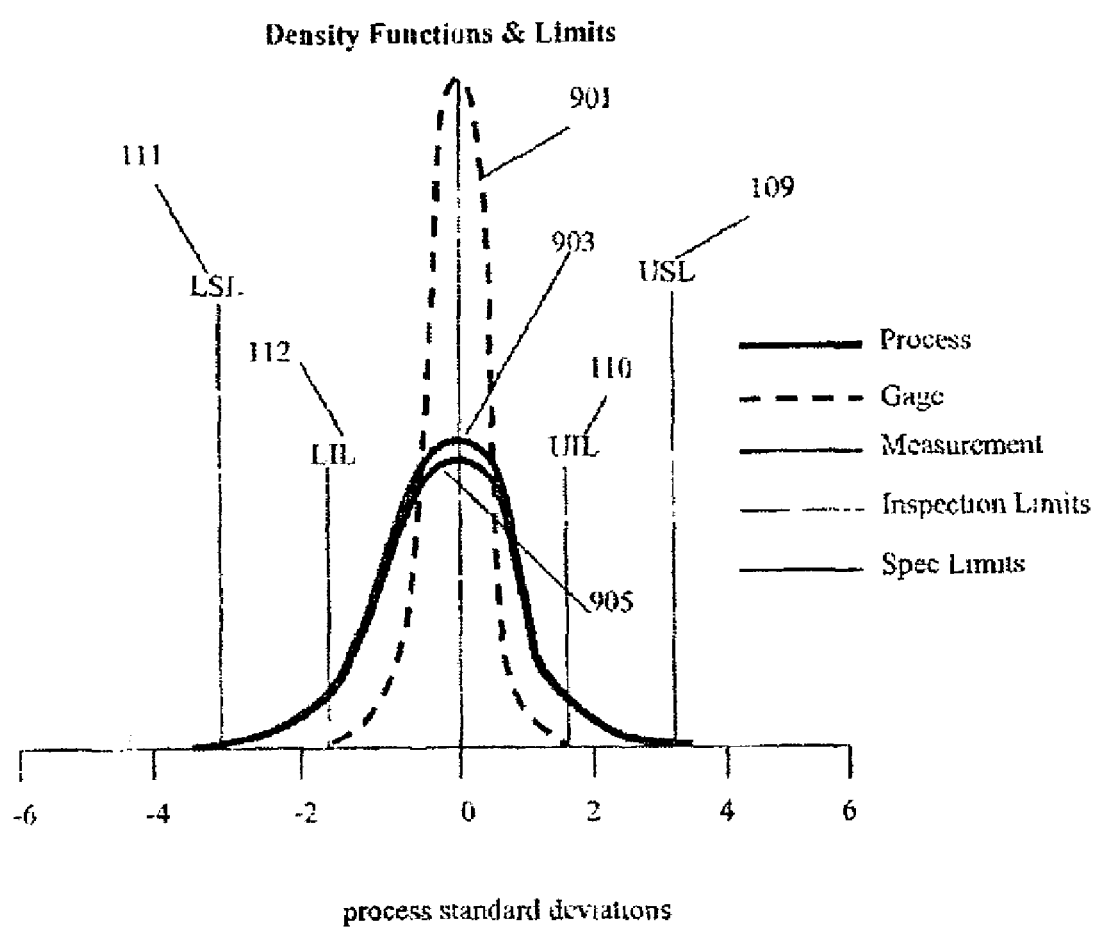
FIG. 9 is diagram illustrating a plot of the specification and inspection limits together with an exemplary mathematical distribution or errors.

FIG. 9 is diagram illustrating a plot of the specification (109, 111) and inspection limits (110, 112) together with an exemplary mathematical distribution of gage error 901, the measurement variation error 905, and the product specification variation 903 based on a normal distribution using the parameters entered using the interface 801. It should be understood that the normal distribution is discussed herein but other known distributions, for example, uniform, gamma, or otherwise, may be used as would be recognized by those skilled in the art.

As soon as the inputs are completed, the table 1001 as shown in FIG. 10 is generated and displayed. This table 1001 is equivalent to the table of probabilities discussed earlier herein, with "parts per million" notation replacing probability. This nomenclature is consistent with notation commonly used in the discussion of inspection processes.

FIG. 10 shows a table 1001 that illustrates the effect of setting inspection limits so that only a few bad products escape. In this case, where the gage is relatively noisy (40% gage R&R), as much as 17% of the good product is rejected. Scrapping or reworking this much good product may be expensive.

Figure 11:
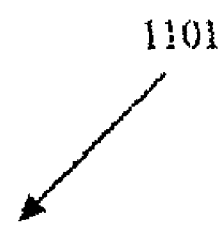
FIG. 11 illustrates an input interface for entering parameters for a second inspection.
Figure 12:
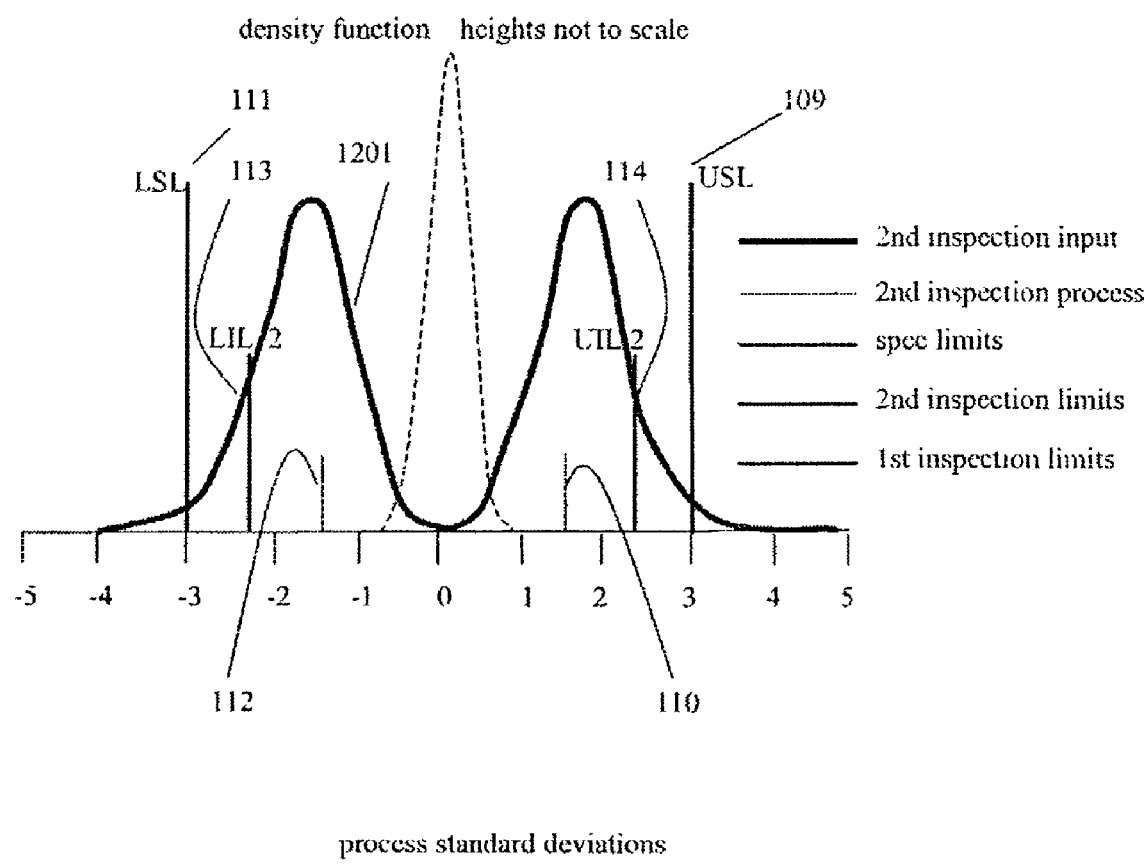
FIG. 12 is a graph illustrating a probability density plot for a second inspection.

By reinspecting the rejected units with a second, less noisy gage, the amount of good product scrapped or reworked can be reduced. This reinspection may be cost effective, even if the second inspection process is more expensive than the first. Using the exemplary input interface 1101, an operator input the parameters for the second inspection as shown in FIG. 11. The density function 1201 for the product characteristic at the second inspection, which is derived for product rejected by the stage one inspection, and the gage noise 1203 for the second inspection are plotted in FIG. 12. The second inspection limits 113 and 114, the specification limits 109 and 111 and the first inspection limits 110 and 112 are also shown.

Figure 13:
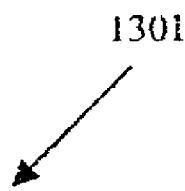
FIG. 13 shows a result table after the second inspection.

FIG. 13 shows the results 1301 for the exemplary second inspection. By using this second inspection, the rejected good product is down to 2% of the original one million while the additional escaping defect count per million has increased by only one.

Figure 14:
FIG. 14 illustrates a cost model for the two step inspection.

The cost model 1401 for the two-stage inspection is shown in FIG. 14. The additional cost of a second inspection has been added to the table. Cost impact of the second inspection can be seen in the total cost table, where average cost of the product has been reduced from $12.04 (with only one inspection) to $11.67 (with two inspection). This additional savings comes about by reducing the amount of scrap and rework even though the second inspection itself adds cost since a better (and generally more expensive) inspection technique is used in the second inspection.

Figure 15:
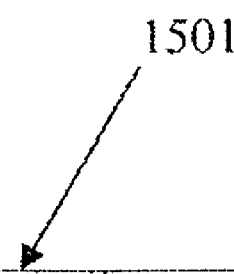
FIG. 15 is a table illustrating optimized values for cost for a one step and a two step inspection.

FIG. 15 shows the exemplary results 1501 of optimizing the two stage (or step) inspection to minimize the total average product cost. The cost structure is the same assumed in the table 1401 shown in FIG. 14, with total escaping defects constrained to be 3.4 per million which is a low number. The optimizer varied both the first and second stage inspection limits to arrive at the minimum average cost. Either custom built optimizing algorithms or a commercially available optimizer (such as that provided with Microsoft Excel's spreadsheet product) may be used as would be recognized by those skilled in the art to achieve the optimization of cost by varying the various inspection level and cost related parameters.

One skilled in the art would recognize that computing units and input units that comprise the system provided herein may be connected through a general purpose electronic network, such as a computer network. The computer network can be a public network, such as the Internet. The computing unit may include a computer system including a central processing unit (CPU) connected to a system memory. The system memory typically contains an operating system, a BIOS driver, and application programs and system programs. In addition, the computer system contains input devices such as a mouse or a keyboard, and output devices such as a printer and a display monitor. The computer system generally includes a communications interface, such as an Ethernet card, to communicate to the electronic network. Other computer systems may also connect to the electronic network which can be implemented as a Wide Area Network (WAN) or as an inter-network such as the Internet.

One skilled in the art would recognize that the above describes a typical computer system connected to an electronic network. It should be appreciated that many other similar configurations are within the abilities of one skilled in the art and it is contemplated that all of these configurations could be used with the inspection quality and cost assessment system and method discussed herein. Furthermore, it should be appreciated that it is within the abilities of one skilled in the art to program and configure a computing system or unit to implement the method steps discussed herein.

Other embodiments of the invention will be apparent to those skilled in the art from a consideration of the specification and the practice of the invention disclosed herein. It is intended that the specification be considered as exemplary only, with the true scope and spirit of the invention also being indicated by the following claims.

What is claimed is:

1. An inspection method comprising:
    determining a plurality of measurement variations and product characteristic variations to define an inspection plane;
    dividing the inspection plane into a plurality of regions corresponding to respective different outcomes resulting from an inspection process;
    determining the probability of each outcome based on a probability mass in each region of the inspection plane, wherein the probability mass is based on a joint probability density of the measurement and product characteristic variations;
    associating costs to various outcomes based on the inspection process;
    computing overall costs of the inspection process by using the associated costs and the determined probability of each outcome based on the regions of the inspection plane;
    performing a first inspection on a product to obtain an inspection outcome; and
    accepting or rejecting the product using the determined inspection plane.

2. The method of claim 1, further comprising optimizing the computed overall costs by varying the costs associated with the various outcomes.

3. The method of claim 1, further comprising optimizing the computed overall costs by varying the permissible product characteristic inspection limit.

4. The method according to claim 1, further comprising optimizing the computed overall costs by using an inspection limit that is different from a permissible product specification limit.

5. The method according to claim 4, wherein the step of dividing the inspection plane into the plurality of regions based on the different outcomes is performed using the inspection limit that is different from a permissible product specification limit.

6. The method according to claim 3, wherein the inspection limit is narrower than a permissible product characteristic specification limit.

7. The method according to claim 6, wherein the step of determining measurement variations and permissible product characteristic variations comprises receiving input values for a process and measurement joint probability density function, a lower specification limit, an upper specification limit, a lower inspection limit, and an upper inspection limit.

8. The method according to claim 1, wherein the step of determining the probability of each outcome comprises summing a joint probability density of the measurement variation and the product characteristic variation in each region.

9. The method according to claim 8, wherein the probability density functions of the measurement variation and the product characteristic variation are normal distributions.

10. The method according to claim 1, wherein the step of associating costs to various outcomes comprises associating unit costs to events of product inspection (CI), product scrapping or rework (CR), escaping defect (CE), and unnecessary rework (CR).

11. The method according to claim 10, wherein the step of dividing the inspection plane into a plurality of regions comprises dividing the inspection plane into the following regions—product within its specification limit is accepted with probability p1, product outside its specification limit is rejected with probability p2, product within its specification limit is rejected with probability p3, and product outside its specification limit is accepted with probability p4.

12. The method according to claim 11, wherein the step of computing overall costs comprises calculating unit costs for the events as follows—product inspection (1*CI), product scrap or rework ((p2+p3)*CR), escaping defect (p4*CE), and unnecessary rework (p3*CR).

13. The method according to claim 1, further comprising performing a second inspection on all products rejected in the first inspection.

14. The method according to claim 13, wherein the second inspection comprises altering the measurement variations from the first inspection.

15. The method according to claim 14, wherein the second inspection comprises using a different product characteristic inspection limit from the first inspection.

16. A system for assessing the cost tradeoffs associated with performing inspections, comprising:
- an input unit for receiving input measurement variations, product characteristics variations, and associated costs of various outcomes based on an inspection process; and
- a computing unit connected to the input unit and configured to:
  - define an inspection plane based on the input measurement variations and the product characteristic variations;
  - divide the inspection plane into a plurality of regions corresponding to the respective different outcomes resulting from the inspection process;
  - determine the probability of each outcome based on the probability mass in each regions of the inspection plane, wherein the probability mass is determined based on the joint probability density of the measurement variation and the product characteristic variation in each region; and
  - computing overall costs of the inspection process by using the associated costs and the determined probability of each outcome based on the regions of the inspection plane.

17. A computer readable data storage medium having program code recorded thereon for assessing the cost tradeoffs associated with performing inspections, the program code causing a computing system to perform steps comprising:
- determining measurement variations and permissible product characteristic variations to define an inspection plane;
- dividing the inspection plane into a plurality of regions corresponding to respective different outcomes resulting from an inspection process;
- determining the probability of each outcome based on the probability mass in each region of the inspection plane, wherein the probability mass is determined based on the joint probability density of the measurement variation and the product characteristic variation in each region;
- associating costs to various outcomes based on the inspection process; and
- computing overall costs of the inspection process by using the associated costs and the determined probability of each outcome based on the regions of the inspection plane.

* * * * *